(12) United States Patent
Smith et al.

(10) Patent No.: US 7,224,970 B2
(45) Date of Patent: May 29, 2007

(54) METHOD OF SCANNING FOR BEACON TRANSMISSIONS IN A WLAN

(75) Inventors: Brian K. Smith, Wellington, FL (US); Suhas Mitra, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 55 days.

(21) Appl. No.: 10/973,555

(22) Filed: Oct. 26, 2004

(65) Prior Publication Data

US 2006/0089138 A1   Apr. 27, 2006

(51) Int. Cl.
H04Q 7/20 (2006.01)

(52) U.S. Cl. .................. 455/434; 455/556.2; 370/412; 370/352

(58) Field of Classification Search ............. 455/556.2, 455/434, 445; 370/412, 352, 311; 709/224; 713/300

See application file for complete search history.

(56) References Cited

U.S. PATENT DOCUMENTS

| | | | |
|---|---|---|---|
| 4,972,455 A | 11/1990 | Phillips et al. | |
| 5,313,489 A | 5/1994 | Menich et al. | |
| 5,402,523 A | 3/1995 | Berg | |
| 5,425,030 A | 6/1995 | Comroe et al. | |
| 5,428,819 A | 6/1995 | Wang et al. | |
| 5,509,035 A | 4/1996 | Teidemann, Jr. et al. | |
| 5,974,319 A | 10/1999 | Kotzin et al. | |
| 6,574,266 B1 | 6/2003 | Haartsen | |
| 2003/0227911 A1* | 12/2003 | Trossen | 370/352 |
| 2004/0081117 A1 | 4/2004 | Malek et al. | |
| 2005/0249227 A1* | 11/2005 | Wang et al. | 370/412 |
| 2006/0014536 A1* | 1/2006 | Demirhan et al. | 455/434 |
| 2006/0073847 A1* | 4/2006 | Pirzada et al. | 455/556.2 |

OTHER PUBLICATIONS

James LaRocca & Ruth La Rocca, "802.11 Demystified" (McGraw-Hill 2002)—Medium Access Control (MAC) Concepts and Architecture, pp. 136 to 139.

* cited by examiner

Primary Examiner—Joseph Feild
Assistant Examiner—Phuoc Doan
(74) Attorney, Agent, or Firm—Scott M. Garrett

(57) ABSTRACT

A wireless station (114) is within range of more than one access point (120, 124) transmitting on the same channel. The wireless station is associated with one access point and not the other. Consequently the wireless station may receive undesired beacons (304) and desired beacons (302) on the channel. To optimize power save operation the wireless station arbitrates between a scan and shut down scanning procedure (708) and a timed window channel scanning procedure (724), depending on whether the desired beacon is the first received beacon upon waking up from a low power state at a target beacon time.

12 Claims, 6 Drawing Sheets

METHOD OF SCANNING FOR BEACON TRANSMISSIONS IN A WLAN

FIELD OF THE INVENTION

This invention relates generally to methods of operating wireless communication systems and wireless local area networks. More specifically, the invention relates to scanning methods for establishing communications between a wireless station and an access point.

BACKGROUND OF THE INVENTION

Wireless local area networks (WLANs) provide network connectivity with portability, allowing wireless network connectivity for devices such as computers, personal digital assistants, wireless phones, and other devices generally referred to as wireless stations. A wireless station, can move about within range of a WLAN base station, referred to as an access point, which typically connects to a wired network and acts as a gateway between wireless stations and the wired network. Any number of applications can be supported over a WLAN, including simple internet access to streaming real time data, such as video and voice calling.

Access points serve as the master timing source for the wireless stations. Each wireless station associated with the access point must synchronize to that access point's timer. To facilitate synchronization, access points broadcast beacon signals, or simply beacons. Beacons contain information about the state of the access point's timer so that wireless stations can adjust their own timer to run in synchronization with the access point. Being in synchronization allows the wireless stations to place portions of the WLAN circuitry into a low power or sleep state, and wake up in time to receive information from the access point at periodic intervals, if necessary. Beacons also allow wireless stations to determine the quality of the signal received from the access point, and compare it with neighboring access points to determine if a change in association is necessary.

Multiple organizations may operate access points within range of each other on the same WLAN channel. When two access points within range of each other are transmitting on the same channel, timing issues can arise due to the imprecision in access point timers. Although they may be programmed to transmit beacons at the same regular interval, differences in the tolerance of timing circuits can cause a difference in time keeping among access points. The result is that one access point's beacons, which initially may have been offset in time with another access point's beacons on the same channel, may begin to "catch up" and overlap, and eventually "pass" the beacons of the other access point.

WLANs may be configured to operate as a closed or open system. In an open WLAN, the organization's Service Set Identifier (SSID) is included in the beacon or supplemental beacon transmissions. Wireless stations can easily determine whether or not a beacon or supplemental beacon transmission belongs to a desired organization. In a closed WLAN, the organization's SSID is not included in the beacon or supplemental beacon transmissions. Wireless stations can only identify which beacons or supplemental beacons belong to a desired organization by parsing the Basic Service Set Identification (BSSID) from the Medium Access Control (MAC) header of the frame. The wireless station then compares the BSSID from the beacon or supplemental beacon to a list of neighbor access points which belong to the desired organization.

Wireless stations may utilize passive scanning for obtaining measurements of a neighbor access point's signal strength. As defined by the WLAN protocol, passive scanning is a simple method whereby the wireless station enables the receiver for a specified duration on a channel to search for beacon or supplemental beacon transmissions. When the passive scan has been completed, the beacons and/or supplemental beacons are processed to determine which belong to the wireless station's neighbor access points. Since the wireless station may be in range of multiple WLANs, there may be beacon and/or supplemental beacon transmissions which belong to other organizations.

Wireless stations may also employ an enhanced passive scanning technique which is based on the WLAN protocol defined passive scanning technique. Enhanced passive scanning allows a wireless station to minimize the amount of time the wireless station's receiver is enabled by calculating the target times at which beacon and/or supplemental beacon transmissions are expected to be transmitted. The wireless station uses the currently associated access point and neighbor access point timing information to calculate the target time of a beacon or supplemental beacon transmission from a neighbor access point. To obtain a neighbor access point measurement, the wireless station enables the receiver at a specific moment in time and when the beacon and/or supplemental beacon is received the receiver is immediately disabled. When multiple access points are operating on the same channel, the wireless station may come out of power save mode at a target time, and receive the wrong access point's beacon. Therefore there is a need for a means by which wireless stations can effectively use power save operation and still receive the correct beacon when there is more than one access point operating on the presently associated channel.

BRIEF DESCRIPTION OF THE DRAWINGS

Various embodiment of the present invention are illustrated by the accompanying figures, wherein.

DETAILED DESCRIPTION OF THE PRESENTLY PREFERRED EMBODIMENTS

Figure 1:
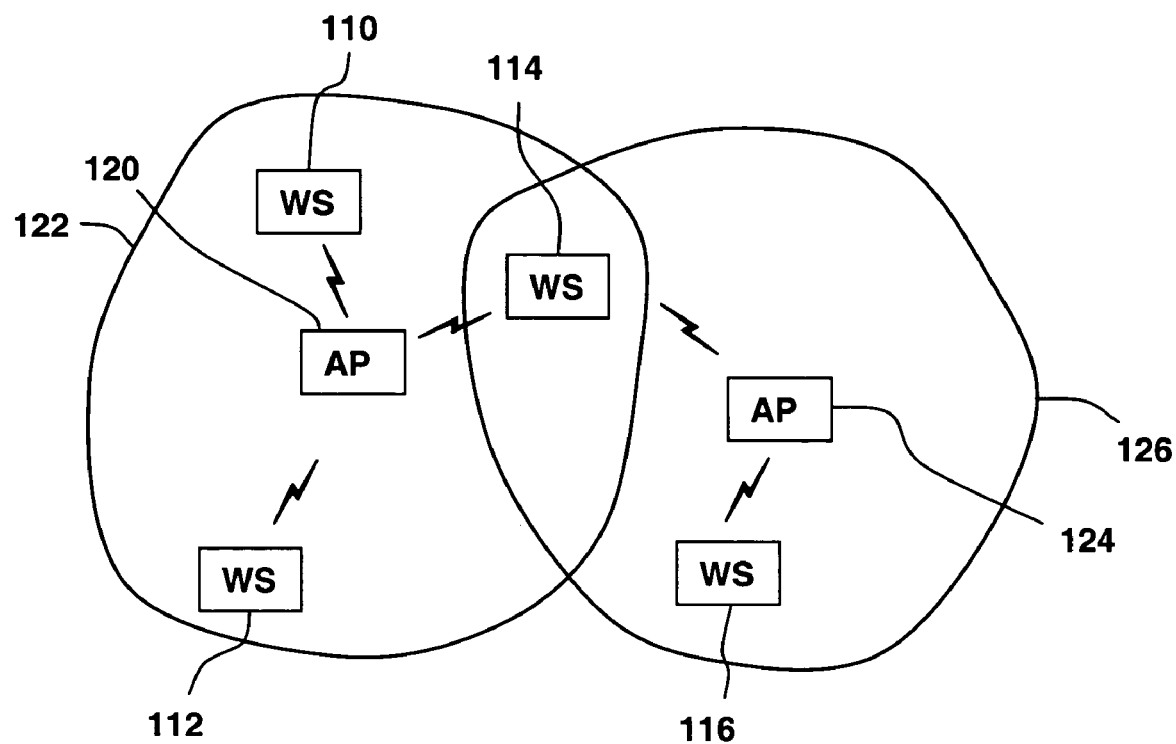
FIG. 1 shows a wireless local area network, in accordance with an embodiment of the invention.

FIG. 1 shows a wireless local area network (WLAN) 100, in accordance with one embodiment of the present invention. WLAN 100 includes one or more wireless communication devices referred to herein as wireless stations 110, 112, 114 and 116, and one or more access points 120 and 124. Access points 120 and 124 are typically connected to an infrastructure network, which in turn may be connected to other wired and wireless networks, as is known in the art. For purposes of example, the two access points shown here are each associated with different organizations, and connect to different networks. Wireless stations 110, 112, 114 and 116 include radio transmitters and receivers for transmitting and receiving signals such as voice data for voice over IP communication, data packets, control frames, and network management frames. Wireless stations 110, 112, 114 and 116 can communicate wirelessly with access points 120 and 124. Access point 120 has a serving area 122 within which wireless stations can receive signals from, and transmit signal to access point 120. Similarly, access point 124 has a serving are 126 which wireless stations can receive signals from, and transmit signals to access point 124. Wireless stations 110, 112 are associated with access point 120, while wireless stations 114, 116 are associated with access point 124. However, the serving areas 122, 126 of the two access points 120, 124 overlap, and wireless station 114 is located within range of both access points 120, 124, and can therefore receive signals from both access points. Furthermore, according to the invention, access points 120, 124 are using the same channel. Although access points 120, 124 may belong to the same organization, more likely, being operated on the same channel, they could belong to different organizations that coincidently have operations near each other, as would be the case on successive floors of an office building, for example.

To begin the process of connecting with an access point, the access point transmits, for example, a beacon signal on a prescribed channel. The prescribed channel comprises a prescribed frequency or frequency band that can be received by any wireless station within the transmission range when the wireless station is appropriately tuned and ready to receive the transmission. The beacon signal, commonly referred to as the beacon, comprises, for example, an access-point timestamp, a beacon interval, a basic service set identification (BSSID), and a traffic indication map (TIM). The access-point timestamp contains timer information from the access point such as a copy of the access point's TSF timer, to be used for synchronizing time-sensitive operations. The beacon interval indicates the time between two targeted start times of a beacon signal. In one embodiment, the beacon interval is substantially 1024 microseconds. The BSSID is an identifier assigned to the local network comprising the wireless stations and the access points serving the wireless stations. The traffic indication map, an information element present within beacon frames generated by access points, contains a DTIM count that indicates how many beacons will appear before the next DTIM, a DTIM period indicating the number of beacon intervals between successive DTIMs, a bitmap control field that provides an indication of broadcast or multicast frames buffered at the access point, and a traffic-indication virtual bitmap containing information corresponding to traffic buffered for a specific station within the BSS that the access point is prepared to deliver at the time the beacon frame is transmitted. The DTIM is a beacon signal that contains a delivery traffic information message (DTIM) after which an access point sends out buffered broadcast and multicast media access control (MAC) service data units (MSDU), followed by any unicast frames. The beacon signal may also include within the beacon frame fields containing information such as capability information, supported rates, and parameters related to frequency hopping (FH) or direct sequence spread spectrum (DSSS) physical layers (PHYs).

The beacons discussed so far may be referred to as full beacons because they contain the full amount of beacon information. In addition to the full beacon signals, another type of beacon signal may be periodically received at a wireless station from an access point, which is referred to as a supplemental beacon. The supplemental beacon includes, for example, an access-point timestamp, a supplemental beacon interval, and a basic service set identifier. Similar to the full beacon signal, the supplemental beacon contains timing and synchronization information from the serving access point though omits the potentially lengthy TIM and other information contained in the full beacon. Because supplemental beacons are shorter than full beacons, transmission and reception of supplemental beacons lessens the load on the network, and supplemental beacons can be sent much more frequently than full beacons. Supplemental beacons allow more frequent signal quality measurements to be performed by the wireless stations so that they can re-affiliate with neighboring access points in the event the presently associated access point's signal weakens, as occurs when the wireless station is moved from one access point's serving area to another.

The wireless station can reduce its power consumption by generating and executing an enhanced passive scanning schedule that is based on timing information received from beacon signals stored in its site timing table (STT). The STT has a site timing table entry corresponding to each serving access point and any neighboring access points from which the wireless station has recently received signals. The wireless station receives beacon signals from selected channels with a radio transmitter/receiver within the wireless station, and then an access point can be selected and connected to as the serving access point based on collected transmission measurements such as the received signal strength indicator (RSSI) and other access point information from the received beacons.

Figure 2:
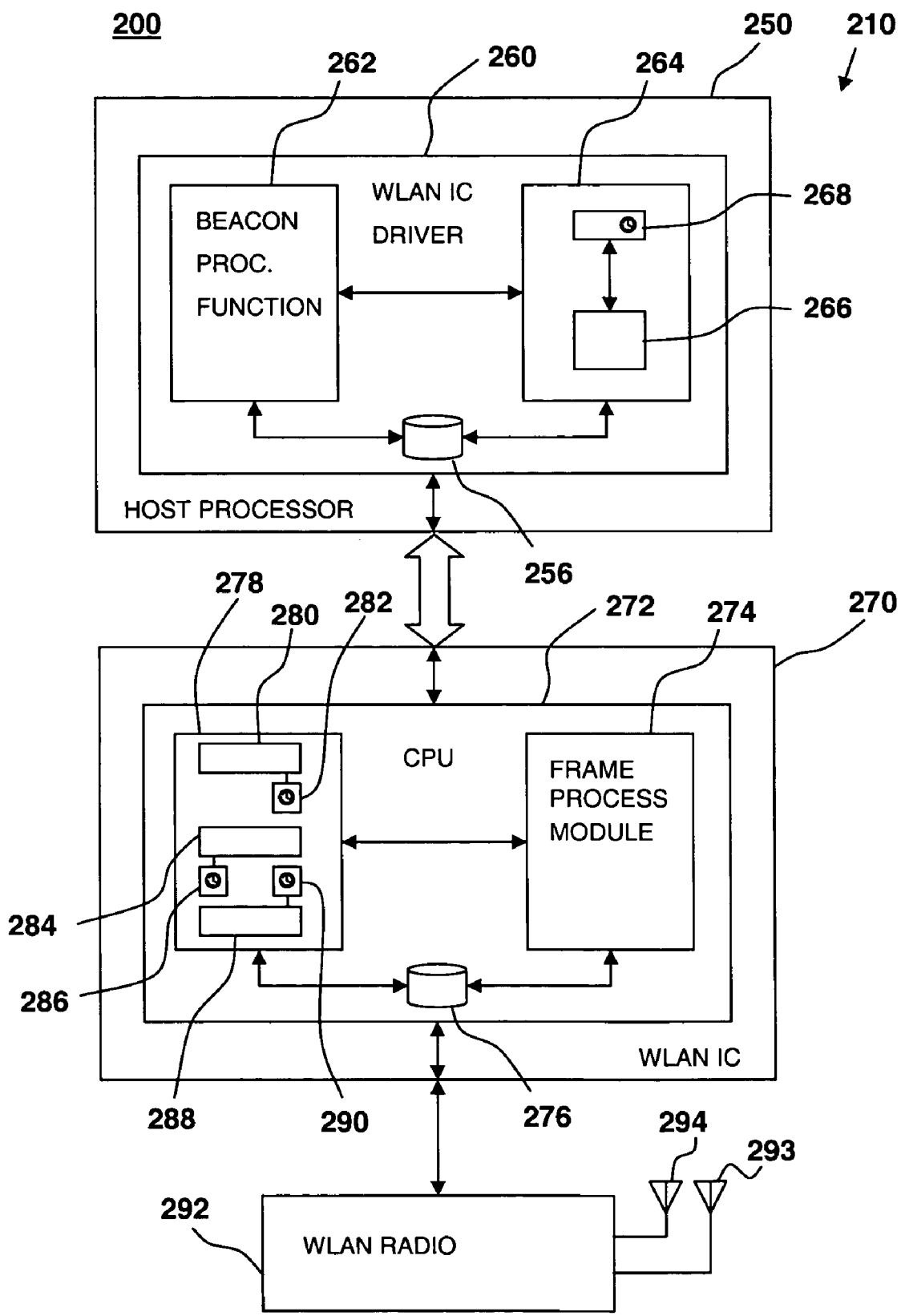
FIG. 2 shows a schematic block diagram of a wireless station including a WLAN radio subsystem, in accordance with an embodiment of the present invention.

FIG. 2 shows a schematic block diagram 200 of a wireless station including a WLAN radio subsystem, in accordance with an embodiment of the present invention. Wireless station 210 includes a host processor 250, a WLAN integrated circuit 270, and WLAN radio 292.

Host processor 250 may be a discrete or an embedded processor for controlling the execution of functions within wireless station 210. In one example of a function, host processor 250 drives WLAN integrated circuit 270 according to computer program code for scanning stored in a memory 256. A portion of this code, the WLAN IC driver 260, drives WLAN integrated circuit 270 accordingly for executing a beacon processing function 262 and for performing other functions such as scanning function 264. Beacons that are received by wireless station 210 may be processed by beacon processing function 262, with the processed results stored in a site timing table or a database within memory 256.

A scheduler 266 run by host processor 250 as part of WLAN IC driver 260 generates a schedule based on site timing table entries stored within memory 256. In one example, the schedule includes a channel number, a target scan start time, and a maximum channel scan time for each site timing table entry in the site timing table. A scan start timer 268 may be used to store a timer value corresponding to a target beacon transmission time. The timer may be located in an internal register, internal memory, external memory, or other suitable memory location.

Host processor 250 interfaces with WLAN integrated circuit 270 using, for example, a 16-bit generic slave interface or other suitable interface such as USB, a serial interface, an RS232 interface, a parallel interface, or a memory-mapped interface, according to appropriate protocols.

WLAN integrated circuit 270 may be, for example, a TNETW1220 or TNETW1230 integrated circuit manufactured by Texas Instruments, Inc., and includes an embedded central processing unit (CPU) 272 that controls functions being executed such as baseband processing and interfacing functions between WLAN integrated circuit 270 and host processor 250. For example, a frame process module 274 may receive beacons and store the results in a memory 276. Memory 276 may be used to buffer beacons and other received data. A scanning process module 278 may receive instruction from WLAN IC driver 260 to execute a scan process. A scan schedule process module 280 stores timing synchronization function (TSF) timer information from a presently associated, or serving access point into a local TSF timer 282. A power management process module 284 determines when to enter a low-power mode by setting a low-power timer 286, entering low power mode, and waking up when low-power timer 286 expires. Radio control module 288 receives a channel number and tunes radio 292 according to a target scan start time up to a maximum channel scan time. A channel scan timer 290 may be set by radio control module 288 corresponding to the scan time computed to receive a beacon. When a beacon is received, radio control module 288 may direct radio 292 to scan another channel. Radio transmissions are sent and received with a pair of diversified antennas 293 and 294.

Scanning is performed by host process 250 with WLAN IC driver 260, in coordination with WLAN integrated circuit 270 and radio 292. In one example, the driver sends a scan command with a list of channels to firmware residing within WLAN integrated circuit 270. The firmware tunes radio 292 to a selected channel. The firmware programs channel scan timer 290 with the maximum time to scan while on the selected channel. Radio 292 listens for beacons until a beacon is received or time runs out, depending on the mode of operation, in accordance with the invention. When a beacon is received, the firmware sends the beacon information to the driver. The driver then compares the access point identifier in the received beacon information with the identifier of the expected beacon. If the received identifier matches the identifier of the received beacon, the driver records access point site timing information. If the received beacon identifier is not the same as the expected beacon identifier, the beacon information is discarded. Depending on the present mode of operation, the radio may continue scanning on the present channel to receive other beacons until the maximum scan time timer expires. Each channel in the list is scanned in turn, and an access point is selected from available access points. Each channel may be scanned at different times, and the wireless station may suppress scanning on channels other than the channel of the presently associated access point for longer periods of time.

The driver can dynamically change the value of channel scan timer 290 for each channel to improve the performance of the scan. The amount of channel scan time may be calculated by using the timing information from the TSF timer received with the beacon from each access point and the local TSF time or local station timestamp stored in local TSF timer 282 in wireless station 210. The calculation may consider jitter in the beacon signal. To find an access point, if none are presently associated, the driver may begin detecting access points by initiating an active scan. The result of the active scan, if access points are in the vicinity, is to populate the site timing table that includes the channel number, BSSID, access-point timestamp (TSF timer from the AP), and local station timestamp. An active scan involves the wireless station transmitting a request on a channel, and waiting for a period of time to see if any access points respond. After active scanning is finished, the wireless station can select an access point with which to affiliate. The driver may then initiate a scan at the neighboring access point scan rate to keep track of neighboring access points in case the present affiliation needs to change to another access point due to changes in signal quality.

The driver reads the timestamp value to calculate the length of time for a scan to receive a beacon from the first access point in the site timing table, and then commands the firmware to perform a scan. The driver receives beacons from access points within range, passed to it by the WLAN IC 270. Ordinarily the driver proceeds in this manner until all access point site timing table entries have been scanned. As a beacon is received, the timing information is updated in the site timing table.

To perform a passive scan, the driver programs scan start timer 268. When scan start timer 268 expires, the driver creates and sends a scan command to the firmware. In an exemplary scan command, the driver sends the number of access points to scan, the scan schedule for the number of access point to scan, the channel number of the access point to scan, the access point scan start time in local TSF timer units, and the maximum scan time to listen for a beacon. The driver orders the scan command in chronological order of expected beacon reception times for neighboring access points.

For each access point within range of wireless station 210, the firmware computes the amount of time remaining before an access point scan start time. If enough time exists to enter a low-power mode, the firmware programs low-power timer 286. The firmware enters the low-power mode until low-power timer 286 expires, then exits the low-power mode. The firmware tunes radio 292 to a selected channel, programs access point channel scan timer 290, and listens for beacons until channel scan timer 290 expires or a beacon is received, depending on the present mode of operation, in accordance with the invention. While the scan is in progress, the firmware buffers the received beacon or beacons, and may send an unsolicited information message to the driver indicating the scan is complete. After all access points are scanned, the driver receives the buffered beacon or beacons for parsing and processing. The driver then updates the site timing table with the received information, selects an appropriate access point, and programs scan start timer 268 with the time remaining until the next scan.

When performing a scan, the driver may receive a packet for transmission. In this case, the driver determines the type of packet. For a voice packet, the driver sends the packet to the firmware for transmission. The firmware pauses the scan for the entire duration of the voice frame exchange sequence. Upon completion of the sequence, the firmware resumes the scan. The firmware may not be able to resume the scan with the next neighboring access point when the voice frame exchange sequence is extended due to retransmissions. For data packets, the driver may hold the low priority packets until an unsolicited information message is received from the firmware indicating the scan is complete. When a high priority data packet is received from the driver, the firmware may abort the scan and transmit the packet. In the event the scan is aborted by the firmware, the driver can determine which neighboring access points were not scanned and reschedule the scan.

When the wireless station is scanning for access point beacons, it scans on a particular channel associated with that access point at a time it expects the beacon to be transmitted. However, because there may be more than one access point transmitting on a channel, such as when two different organizations have established WLANs within transmission range of each other, the beacon received by wireless station may not be from the expected access point, and may be from a non-network access point. The host processor can determine if a received beacon is from the expected access point by comparing the access point identifier in the received beacon with the access point identifier known to be associated with the expected access point. The BSSID is a type of access point identifier that may be used in the comparison. Power save operation may be performed in one of two way, according to the invention. The WLAN radio subsystem, comprising the WLAN IC and WLAN radio, may be shut down immediately after successfully receiving a beacon and passing the beacon information to the host processor. However, by the time the host processor determines the received beacon was not from the expected access point, the WLAN radio subsystem may already be in the process of entering low power mode, and the wireless station may miss the desired beacon. To continue to facilitate low power operation, and receive the desired beacons, the host processor updates the site timing table to indicate that when scanning for that particular access point, to use a timed window procedure at the next occurrence of scanning for the access point's beacon, as opposed to the scan and shut down procedure. When the timer next indicates it is time to scan for the access point, the WLAN radio subsystem will receive all transmissions on a channel for a time period, and pass all information to the host processor. It is likely that the desired beacon will be received shortly after the non-network beacon also being transmitted on the channel.

Figure 3:
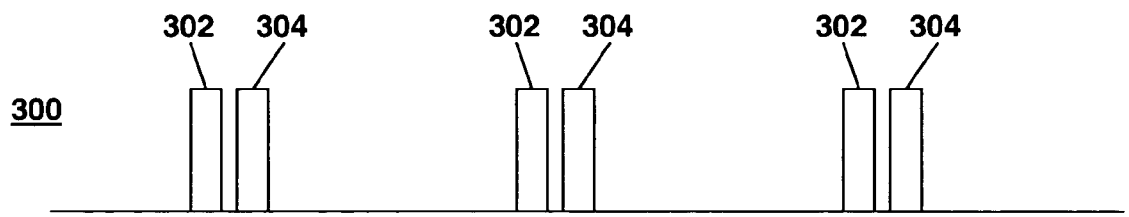
FIGS. 3-6 show a series of timing diagrams of a WLAN channel having both desired and undesired beacons, in accordance with an embodiment of the invention.

Referring now to FIGS. 3-6, there are shown a series of beacon timing diagrams 300, 400, 500, and 600, respectively, showing a series of beacon transmissions. The beacons are periodic, so are shown repeated several times on each chart. There is desired beacon 302, and an undesired beacon 304. Both beacons are transmitted on the same WLAN channel. The desired beacon is a beacon the wireless station is intending to receive from a home network access point, such as the access point with which the wireless station is presently associated, or a neighbor access point which the wireless station to which the wireless station may roam. The undesired beacon 304 is a beacon from another access point which the wireless station is not presently interested. For example, the undesired beacon may be transmitted by a non-network access point. By non-network it is meant that the access point supports a network with which the wireless station has no association, and is not authorized to use. In FIG. 3, the desired beacon 302 is shown slightly ahead of the undesired beacon 304. The wireless station wakes up the WLAN radio subsystem at a target transmit time, which occurs slightly before the desired beacon is transmitted, and receives the desired beacon. As soon as the desired beacon is received, the WLAN driver shuts down the WLAN radio subsystem until the next beacon is to be received, or some other activity is necessary. Thus, in FIG. 3, the wireless station never receives the undesired beacon 304.

Figure 4:
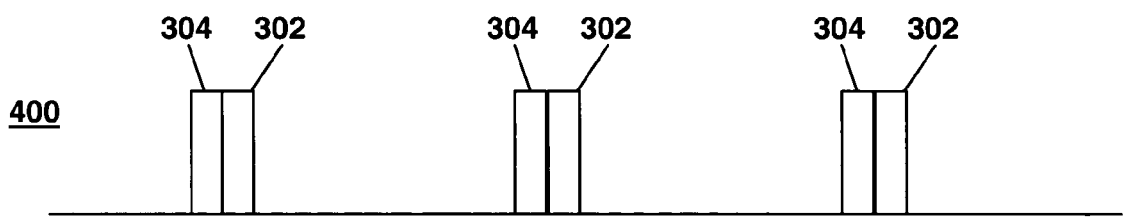

In FIG. 4, however, because of differences in the tolerance of the timers of the access points, the undesired beacon 304 has drifted in from of the desired beacon 302 in time. In this situation when the WLAN radio subsystem wakes up, it may receive the undesired beacon 304, and then shut down, missing the desired beacon 302. When this occurs, the host resets the procedure for receiving beacons on that channel to a timed window scanning procedure, which involves simply leaving the WLAN radio subsystem on for a period of time after the target beacon time and receiving all transmissions on the channel. The change in scan procedure is effective at the next scan time. When the next scan time occurs, the data is parsed by the host, and undesired beacons and data other than the desired beacon is discarded.

Figure 5:
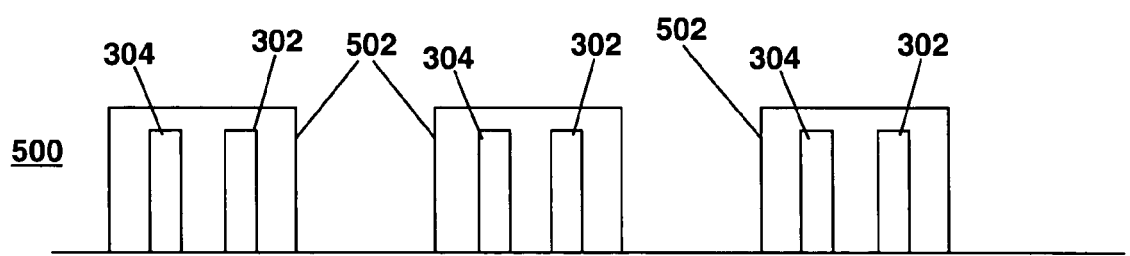

In FIG. 5 a timed window procedure is used to receive beacon transmissions on the channel. After failing to receive a desired beacon using the scan and shutdown procedure, the wireless station switches to a timed window procedure for the next scan after failing with the scan and shut down procedure. A timed window 502 indicates a time period during which the wireless station maintains the WLAN radio subsystem on. Consequently, while the undesired beacon 304 is received first, the desired beacon is also received in the window. The data received other than the desired beacon data is discarded. While using the timed window procedure, the host checks to see if the desired beacon is the first beacon received, and if so, reverts to using the scan and shutdown procedure for the next beacon reception on the channel.

Figure 6:
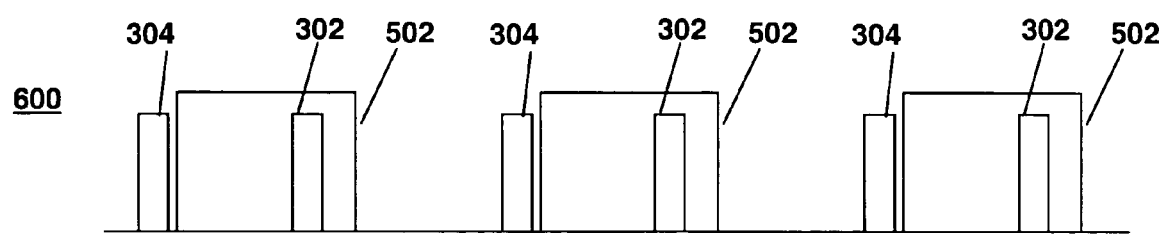

FIG. 6 shows the same channel with both the undesired beacon 304 and desired beacon 302, but after a period of time has passed since the condition of FIG. 5 occurred. What can be seen in the progression of FIGS. 3-6 is that the timer of the access point transmitting the undesired beacon is slightly faster than the timer of the access point transmitting the desired beacon. Consequently the undesired beacon appears to "slide past" the desired beacon over time. Initially the wireless station used the scan and shut down procedure in FIG. 3, but when the undesired beacon began appearing in the channel ahead of the desired beacon, as in FIG. 4, the wireless station changed to a timed window procedure as shown in FIG. 5. In FIG. 6 the time difference between the undesired beacon and the desired beacon has advanced so far that the undesired beacon is no longer received within the timed window, and therefore the desired beacon is the received first after the wireless station wakes up the WLAN radio subsystem. When the host processor determines the desired beacon is received first, it again changes to the scan and shut down method for receiving beacons in the channel, beginning with the next beacon reception cycle.

Figure 7:
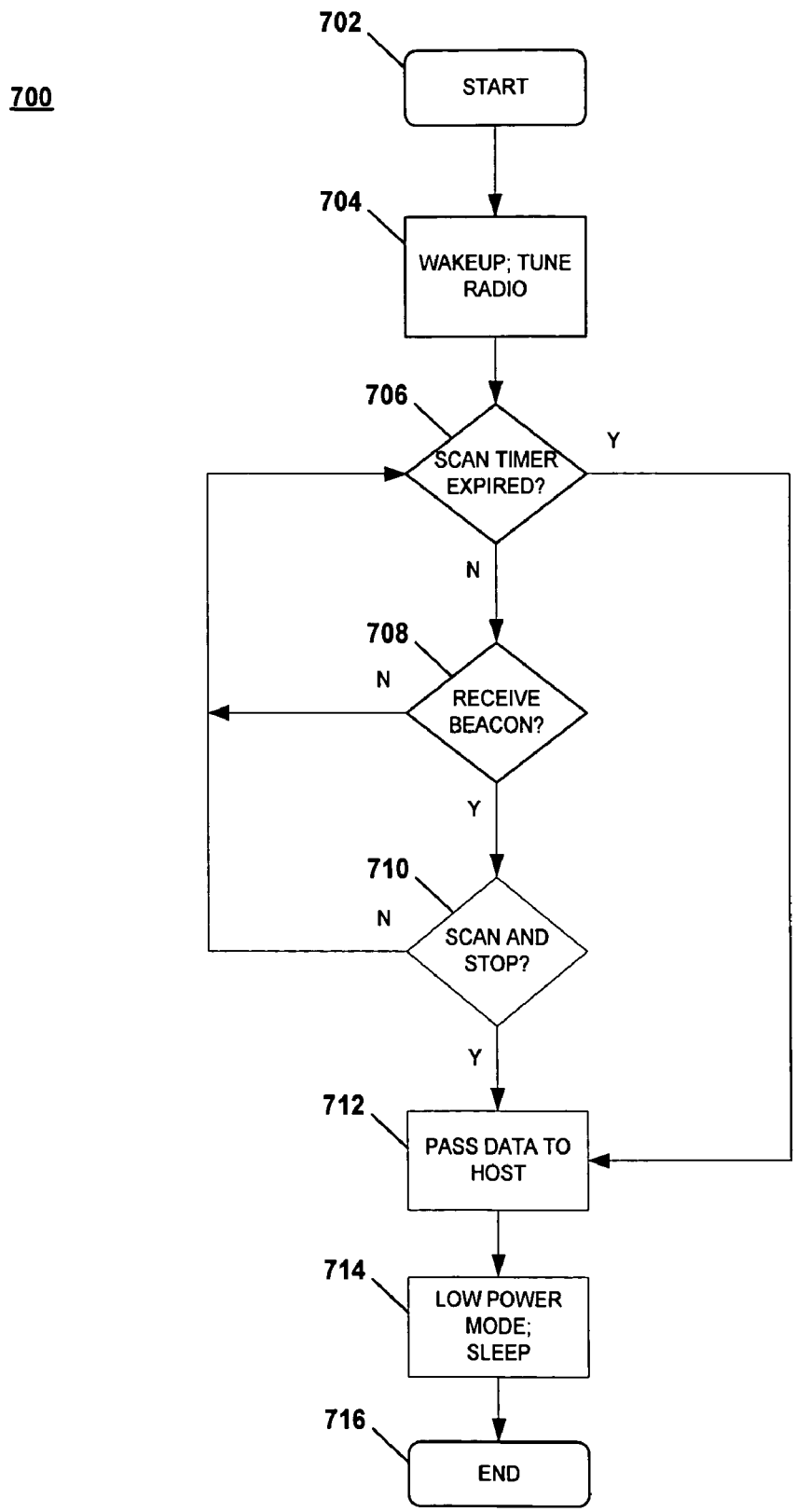
FIG. 7 shows a flow chart diagram of a method of scanning for a beacon, in accordance with an embodiment of the invention.

Referring now to FIG. 7, there is shown a flow chart diagram 700 of a method of scanning for a beacon, in accordance with an embodiment of the invention. The method illustrated in FIG. 7 is representative of how the WLAN radio subsystem operates in one embodiment of the invention, and in particular it shows an embodiment of the firmware operation. At the start 702 the wireless station is powered on, but the WLAN radio subsystem is in low power or sleep mode. The host processor maintains timers to determine when the next target beacon time occurs. When the target beacon time arrives, the WLAN radio subsystem is power up, and given instructions including which channel to tune the radio for reception (704). The radio then receives a beacon (706). The present setting for the channel scan procedure may be checked after receiving the beacon (708). If the present scan procedure for the channel is scan and shut down, then the WLAN radio subsystem passes the beacon data to the host (726), and the WLAN radio subsystem is powered down into a low power or sleep state (722). The method then terminates (716) and the host processor analyzes the results. If the present mode is not scan and shutdown (708), then the WLAN radio subsystem continues receiving (724) until the timed window is over, and then passes the results to the host processor (726) and goes to sleep (722), terminating the method (716).

Figure 8:
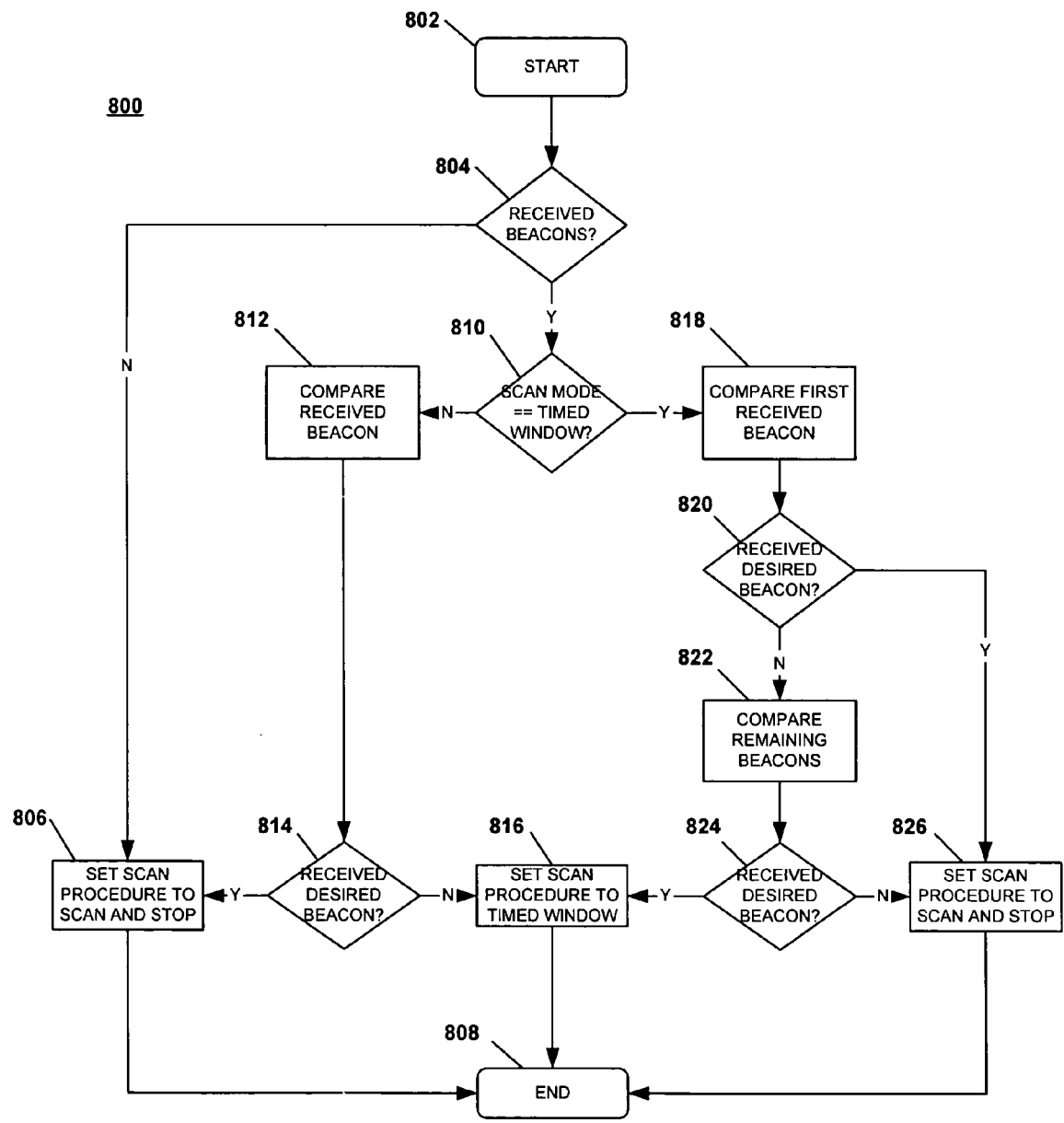
FIG. 8 shows a flow chart diagram of a method of scanning for a beacon, in accordance with an embodiment of the invention.

Referring now to FIG. 8, there is shown flow chart diagram 800 of a method of scanning for a beacon, where the host processor analyzes the results of the scan performed by the WLAN radio subsystem. At the start (802), the WLAN radio subsystem firmware has passed the results of its scan to the host processor. The host processor then determines the mode of scanning used by the WLAN radio subsystem (804). For both the scan and stop and timed window scanning procedures, the host processor checks the results for the desired access point identifier, such as an access point BSSID (806, 820). If the scanning procedure used was not the timed window procedure, meaning it was the scan and stop procedure, the host processor determines whether the desired beacon was received before any other beacons that may have been received (808). If so, then the host process maintains the scanning procedure as scan and stop (810). If the desired beacon was not received, or if the desired beacon was not received first, the results are searched for any beacon on the same channel as the desired access point (814). If an undesired beacon is found on the same channel as the desired access point, the present scanning procedure is changed to the timed window procedure (818) and the method terminates (812), otherwise, the scan and stop procedure is continued (810) and then the method terminates (812).

If upon initiating the method and the present scanning procedure is the timed window procedure (804), the host processor searches the scan results (820). If the desired access point's beacon is located in the results as the first received beacon (822) is the desired access point's beacon, then the scanning procedure is set to scan and stop for the next scan cycle (824). Otherwise the host determines if any other beacons are present on the channel (814, 816), and sets the scan procedure to scan and stop if no beacons are found (810), or if other beacons are found on the channel, the timed window procedure is maintained (818), and the method terminates (812).

Now a method of scanning for a beacon, in accordance with an embodiment of the invention, is discussed. The method is representative of how the WLAN radio subsystem operates in one embodiment of the invention, and in particular it shows an embodiment of the firmware operation in accordance with an enhanced firmware design. At the start of the method the wireless station is powered on, but the WLAN radio subsystem is in low power or sleep mode. The host processor maintains timers to determine when the next target beacon time occurs. When the target beacon time arrives, the WLAN radio subsystem is powered up, and given instructions including which channel to tune the radio for reception. The radio then receives a beacon and passes the beacon data to the host processor. The present setting for the channel scan procedure may be checked after receiving the beacon. If the present scan procedure for the channel is scan and shut down, then after the WLAN radio subsystem passes the beacon data to the host a portion of the WLAN radio subsystem is powered down into a low power or sleep state. The firmware then checks the access point identifier of the received beacon. If the received beacon is not from the desired access point, the scanning procedure for the next beacon scanning cycle is set to the timed window procedure. If the received beacon is determined to be from the desired access point, the method terminates.

If the present scanning procedure is not scan and stop, then the WLAN radio subsystem checks the access point identifier to see if the received beacon was from the desired access point. If the received beacon is from the desired access point, the scanning procedure for the next cycle is set to scan and stop, the WLAN radio subsystem is placed in low power mode after the timed window scanning period expires, and the method terminates. If the received beacon, being the first received beacon of the present scanning cycle, is not from the desired access point, the WLAN radio subsystem continues scanning until the timed window scanning period expires, the received data, if any, is passed to the host processor, the WLAN radio subsystem in the placed in a low power mode, and the method terminates.

Therefore the invention arbitrates between channel scanning procedures to optimize power saving operation when there is no interfering access point beacons in the channel, and still allows the wireless station to receive the desired beacons in the presence of interfering beacons in the channel. The invention provides a method of scanning for beacon transmissions from a wireless local area network (WLAN) access point by a wireless station. The method may commence using either a scan and shutdown procedure or a timed window procedure. The scan and shut down procedure includes waking up a WLAN radio subsystem of the wireless station at a target beacon time, and receiving a beacon on a presently associated channel. The beacon transmission includes beacon data such as a received access point identifier. The WLAN radio subsystem passes the beacon data to a host processor of the wireless station, which places the WLAN radio subsystem into a low power state immediately after receiving the beacon and passing the beacon data to the host processor. The timed window procedure maintains the WLAN radio subsystem in an active state, receiving all data on the channel, for a preselected period of time. During the timed window all beacon data is passed to the host processor. The host processor under both channel scan procedures compares received access point identifiers with a presently associated or desired access point identifier. If the received access point identifier is the same as the presently associated access point identifier, and the present channel scan procedure is scan and shut down, the method continues using the scan and shut down procedure. If the present channel scan procedure is the timed window procedure, and the first received beacon is the desired beacon, the wireless station changes the channel scan procedure to the scan and shut down procedure for the next beacon cycle. If the received access point identifier is not the same as the presently associated access point identifier, and the present channel scan procedure is scan and shut down, the wireless station discards the beacon data and uses the timed window scanning procedure for receiving the next beacon transmission. If the present channel scanning procedure is the timed window procedure, and the first received beacon is not the desired beacon, the wireless station continues using the timed window procedure for the channel.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of scanning for a beacon from a wireless local area network (WLAN) access point by a wireless station, comprising:

performing a scan and shut down procedure, including:
waking up a WLAN radio subsystem of the wireless station at a scan start time;
receiving a beacon from one of at least two access points operating on the same channel in the vicinity of the wireless station, the beacon including beacon data including an access point identifier;
passing the beacon data to a host processor of the wireless station;

placing the WLAN radio subsystem into a low power state immediately after receiving and passing;

comparing the access point identifier with a desired access point identifier, performed by the host processor;

if the access point identifier is the same as the desired access point identifier, continuing with the scan and shut down procedure for receiving a next beacon transmission; and if the access point identifier is not the same as the desired access point identifier, discarding the beacon data and using a timed window scanning procedure for receiving the next beacon transmission.

2. A method of scanning for a beacon as defined in claim 1, wherein receiving the beacon data includes receiving a basic service set identifier as the access point identifier.

3. A method of scanning for a beacon as defined in claim 1, wherein receiving the beacon transmission is receiving a full beacon.

4. A method of scanning for a beacon as defined in claim 3, wherein receiving the full beacon includes receiving the full beacon at a substantially 102.4 millisecond interval.

5. A method of scanning for a beacon as defined in claim 1, wherein receiving the beacon is receiving a supplemental beacon, the supplemental beacon having less beacon data than a full beacon.

6. A method of scanning for a beacon as defined by claim 1, wherein waking up the WLAN radio subsystem at the scan start time is performed with timing information received in a previously received beacon.

7. A method of scanning for a beacon from a wireless local area network (WLAN) access point by a wireless station, comprising:

performing a timed window scanning procedure, including:

waking up a WLAN radio subsystem of the wireless station at a scan start time;

receiving a first beacon and a second beacon, the first and second beacons transmitted by first and second access points, respectively, transmitting on the same channel, the first and second beacons including beacon data including an access point identifier;

passing the beacon data to a host processor of the wireless station;

placing the WLAN radio subsystem into a low power state after the end of a timed window interval;

comparing the access point identifier of the first beacon with a desired access point identifier, performed by the host processor;

if the access point identifier of the first beacon is the same as the desired access point identifier, using a scan and shut down procedure for receiving a next beacon transmission; and if the received access point identifier of the first beacon is not the same as the desired access point identifier, discarding the beacon data and using the timed window procedure for receiving the next beacon transmission.

8. A method of scanning for a beacon as defined in claim 7, wherein receiving the beacon data includes receiving a basic service set identifier as the access point identifier.

9. A method of scanning for a beacon as defined in claim 7, wherein receiving the first beacon transmission is receiving a full beacon.

10. A method of scanning for a beacon as defined in claim 9, wherein receiving the full beacon includes receiving the full beacon at a substantially 102.4 millisecond interval.

11. A method of scanning for a beacon as defined in claim 7, wherein receiving the first beacon transmission is receiving a supplemental beacon, the supplemental beacon having less beacon data than a full beacon.

12. A method of scanning for a beacon as defined by claim 7, wherein waking up the WLAN radio subsystem at the scan start time is performed with timing information received in a previously received beacon.

* * * * *